United States Patent [19]

Drent et al.

[11] Patent Number: 5,025,092

[45] Date of Patent: Jun. 18, 1991

[54] POLYMERIZATION OF CARBON MONOXIDE WITH ETHYLENICALLY UNSATURATED ALCOHOL

[75] Inventors: Eit Drent; Anthonius J. M. Breed, both of Amsterdam, Netherlands

[73] Assignee: Shell Oil Company, Houston, Tex.

[21] Appl. No.: 451,920

[22] Filed: Dec. 18, 1989

[30] Foreign Application Priority Data

Dec. 29, 1988 [GB] United Kingdom ............... 8830334

[51] Int. Cl.$^5$ ............................................ C08G 67/02
[52] U.S. Cl. .................................. 528/392; 528/271; 528/425
[58] Field of Search ........................................ 528/392

[56] References Cited

U.S. PATENT DOCUMENTS

| | | |
|---|---|---|
| 4,634,780 | 1/1987 | Alper et al. ........................ 549/273 |
| 4,841,020 | 6/1989 | Drent ................................. 528/392 |

FOREIGN PATENT DOCUMENTS

| | | |
|---|---|---|
| 055875 | 7/1982 | European Pat. Off. . |
| 106379 | 4/1984 | European Pat. Off. . |
| 190473 | 8/1986 | European Pat. Off. . |
| 198521 | 10/1986 | European Pat. Off. . |
| 235864 | 9/1987 | European Pat. Off. . |
| 282142 | 9/1988 | European Pat. Off. . |

*Primary Examiner*—Harold D. Anderson

[57] ABSTRACT

Polyesters or polyanhydrides are produced by reaction of unsaturated alcohol or unsaturated carboxylic acid of defined structure, respectively, with carbon monoxide in the presence of a catalyst composition formed from a palladium salt, a monodentate phosphorus ligand optionally mixed with bidentate phosphorus ligand, and an oxygen-containing acid having a pKa below 2.

9 Claims, No Drawings

POLYMERIZATION OF CARBON MONOXIDE WITH ETHYLENICALLY UNSATURATED ALCOHOL

FIELD OF THE INVENTION

This invention relates to the production of polymeric materials of polyester or polyanhydride functionality. More particularly, the invention relates to a process for the production of such functionalized polymers by carbonylation of unsaturated alcohols or unsaturated carboxylic acids, respectively.

BACKGROUND OF THE INVENTION

The carbonylation of unsaturated compounds, particularly unsaturated hydrocarbons, is broadly known in the art. European Patent No. 55,875 describes a process for carbonylation of an olefin in the presence of water and optionally alcohol or acid, to produce acids, esters or anhydrides. This process employs a halide-free palladium catalyst and a tertiary phosphine with at least one aliphatic substituent. A similar process is disclosed by European Patent No. 106,379 where the catalyst system contains at least a minimum amount of triarylphosphine and a non-hydrohalogenic strong acid. European Patent Application No. 190,473 discloses a similar process wherein the catalyst system comprises a divalent palladium compound, at least a 15-fold excess of organic phosphine and certain strong acid. European Patent Application No. 198,521 is directed to carbonylation of conjugated dienes in the presence of water or alcohol, an aprotic solvent and a catalyst system containing an excess of tertiary phosphine and at least one mol of hydrogen chloride per mol of phosphine. Yet another similar process is disclosed in European Patent Application No. 235,864 wherein the catalyst system contains non-carboxylic acid having a pKa greater than 2 and/or a sterically hindered carboxylic acid having a pKa below 4.5. European Patent Application No. 282,142 discloses the inclusion of a phosphine having a heterocyclic substituent in the catalyst system.

The carbonylation of an unsaturated alcohol in the presence of acid and a bimetallic catalyst system is shown by U.S. Pat. No. 4,634,780. The product is a lactone and apparently polymerization does not take place. Substitution of an unsaturated acid for the alcohol would lead to a cyclic anhydride if the reaction were analogous. Although such lactones or cyclic anhydrides could be polymerized by subsequent procedures, it would be of advantage to provide a process for carbonylation of unsaturated alcohols or acids which directly provides polymeric polyesters or polyanhydrides.

SUMMARY OF THE INVENTION

The present invention relates to a process for the production of polyesters or polyanhydrides by the carbonylation of certain unsaturated alcohols or acids. More particularly, the present invention relates to such a polymerization process in the presence of a catalyst composition formed from a palladium compound, a monodentate organic phosphine optionally combined with a bidentate phosphine and certain protic acids having a pKa below 2, wherein the ratios of catalyst composition components are within defined ranges and reaction takes place at specified reaction conditions.

DESCRIPTION OF THE INVENTION

The process of the invention comprises the reaction of certain ethylenically unsaturated alcohols or acids with carbon monoxide in the presence of a catalyst composition formed from a divalent palladium compound, a monodentate phosphorus ligand, optionally mixed with a bidentate phosphorus ligand, and certain protonic acids having a pKa below 2. Within the catalyst composition mixture, the molar ratio of total phosphine to palladium is no greater than 10, the molar ratio of total phosphine to the acid is more than 1 and the temperature at which the reaction takes place is less than 140° C. The products from carbonylation of alcohol or acid is a polyester or a polyanhydride, respectively, of generally linear structure although a minor proportion of the polymer product contains branching on carbon atoms alpha to the introduced carbonyl moiety.

The ethylenically unsaturated alcohol or carboxylic acid reactant is a compound of up to 30 carbon atoms inclusive, preferably up to 20 carbon atoms inclusive, which, in the case of an alcohol is a primary alcohol containing at least 4 carbon atoms between the hydroxyl substituent and the ethylenic moiety, or which contains in the case of an acid, at least 3 carbon atoms between the carboxyl group and the ethylenic unsaturation. The alcohol or acid reactant is of branched or linear structure and is hydrocarbyl containing only atoms of carbon and hydrogen or is substituted hydrocarbyl containing additional atoms in the form of inert substituents such as alkoxy or halo. The preferred unsaturated reactants are of linear structure and are hydrocarbyl.

The preferred unsaturated alcohol reactants are therefore represented by the formula $$R-CH=CH-CH_2)_nCH_2OH \qquad (I)$$

wherein R is hydrogen or straight chain alkyl and n is an integer of at least 4. Illustrative of such unsaturated alcohols are 5-hexen-1-ol, 6-hepten-1-ol, 5-hepten-1-ol, 7-octen-1-ol, 6-octen-1-ol, 6-decen-1-ol, 10-undecen-1-ol, 8-dodecen-1-ol, 13-tetradecen-1-ol, 6-tetradecen-1-ol, 14-pentadecen-1-ol and 18-nonadecen-1-ol. The unsaturated carboxylic acids useful in the process of the invention are represented by the formula $$R-CH=CH-CH_2)_mCO_2H \qquad (II)$$

wherein R has the previously stated meaning and m is an integer of at least 3. Illustrative of such alkenoic acids are 5-hexenoic acid, 7-octenoic acid, 9-decenoic acid, 6-undecenoic acid and 10-undecenoic acid.

The process of the present invention comprises the contacting of the unsaturated reactant with carbon monoxide in an inert, aprotic reaction diluent in the presence of a catalytic amount of the catalyst composition. The palladium precursor of the catalyst composition is a palladium compound, preferably a palladium salt. Salts of inorganic acids are suitable and palladium sulfate or palladium nitrate may be employed in the formation of the catalyst composition, but preferred palladium salts are salts of organic carboxylic acids such as palladium formate, palladium acetate and palladium propionate. The use of palladium acetate in the formation of the catalyst composition is preferred. Regardless of the form of the palladium, sufficient palladium compound is added to the catalyst composition solution to provide from about $1 \times 10^{-7}$ mol to about $1 \times 10^{-1}$ mol of palladium per mol of unsaturated reactant. Quantities of palladium from about $1 \times 10^{-6}$ mol to about $1 \times 10^{-3}$ mol per mol of unsaturated alcohol or acid are preferred.

The monodentate phosphorus ligand employed as a catalyst composition precursor is primary, secondary or tertiary, but preferably is a tertiary monophosphine of up to 40 carbon atoms. Such preferred tertiary phosphines are represented by the formual

$$P(R')_3 \tag{III}$$

wherein R' independently is aromatic of up to 14 carbon atoms. R' is suitably hydrocarbyl as exemplified by phenyl, tolyl and naphthyl, but R' is also suitably substituted hydrocarbyl containing atoms other than carbon and hydrogen in the form of monovalent substituents which are preferably electron-withdrawing substituents such as halo, preferably the middle halogens chloro and bromo, nitro and trifluoromethyl. The preferred substituted hydrocarbyl R' groups are halophenyl and the class of triphenylphosphine and tri(p-chlorophenyl)phosphine are preferred monophosphine precursors of the catalyst composition.

It is useful on occasion to provide to the catalyst composition solution a bidentate phosphorus ligand of the formula

wherein R" independently is hydrocarbyl aromatic of up to 12 carbon atoms inclusive, e.g., phenyl, tolyl, xylyl and naphthyl. The X group is a divalent linking hydrocarbyl aliphatic linking group of up to 10 carbon atoms with from 2 to 5 carbon atoms in the bridge. The preferred X groups are 1,3-propylene and 1,4-butylene and the preferred bidentate phosphorus ligands are 1,3-bis(diphenylphosphino)propane and 1,4-bis(diphenylphosphino)butane. The use of bidentate phosphorus ligand is optional and is not required but molar amounts of bidentate phosphorus ligand less than 10 times the molar amount of the monophosphine ligand are satisfactory. Independent of the phosphorus ligand provided, the molar quantity of phosphine ligand as compared to the molar quantity of palladium compound should be less than 10. Molar ratios of phosphine ligand to palladium compound from about 8:1 to about 1:1 are preferred.

The third precursor of the catalyst compositions of the invention is a protonic acid having a pKa (measured in water at 18° C.) of less than 2. Suitable acids are oxygen-containing acids including inorganic acids such as sulfuric acid and perchloric acid and organic acids including sulfonic acids such as p-toluenesulfonic acid, methanesulfonic acid and trifluoromethanesulfonic acid as well as carboxylic acids such as trigluoroacetic acid, trichloroacetic acid and difluoroacetic acid. The acid precursor of the catalyst composition is provided in a quantity such that the molar ratio of total phosphine ligand to the acid component is less than 1.

The process of the invention is conducted by contacting the reactants and catalyst composition in an inert reaction diluent under polymerization conditions. The carbon monoxide reactant is provided as such or as a mixture with other gases, e.g., nitrogen, carbon dioxide or noble gases. The use of a synthesis-type gas is suitable as a source of carbon monoxide if the hydrogen concentration is not unduly high. Use of a carbon monoxide/hydrogen mixture of more than about 20% by volume or even more than about 5% by volume of hydrogen is not satisfactory because of the undesirable hydrogenation side reactions which take place. The reaction diluent is aprotic and is inert under the condirions of the process of the invention. Suitable reaction diluents include hydrocarbons such as hexane, octane, benzene and toluene, halohydrocarbons such as methylene dichloride, chloroform and chlorobenzene, sulfones such as dimethyl sulfone and sulfolane, N-alkyl amides such as N,N-dimethylformamide and N-methyl-2-pyrrolidone, esters such as methyl benzoate and ethyl acetate and ethers illustrated by acyclic ethers such as methyl isobutyl ether, diisopropyl ether, and diethyleneglycol dimethyl ether as well as cyclic ethers such as tetrahydrofuran, dioxane and dioxolane. In general, ethers are preferred as reaction diluent.

The contacting of the reaction mixture components is accomplished by conventional methods such as stirring or shaking. The polymerization conditions include a reaction temperature below 140° C., preferably from about 50° C. to about 130° C., and a reaction pressure from about 5 bar to about 100 bar, preferably from about 5 bar to about 100 bar. Subsequent to polymerization, the reaction is terminated as by cooling the reactor and contents and releasing the pressure. The polymer product is recovered by well known procedures such as filtration or decantation preceded by precipitation with a non-solvent if the polymer product is soluble in the product mixture.

The product resulting from reaction of unsaturated alcohol or unsaturated acid is a polyester or a polyanhydride, respectively. In terms of the alcohol reactant of formula I, the polymer product contains linear polymer of the formula

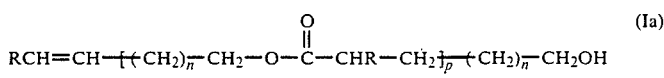

and polymer having branched linkages of the illustrative formula

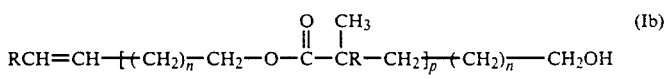

wherein R and n have the previously stated meanings and p is an average number from about 1 to about 100. In terms of the unsaturated acid reactants of formula II, the linear polyanhydride is of the formula

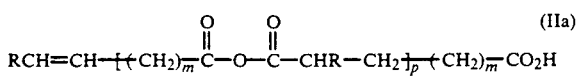

and the product having branched linkages is of the illustrative formula

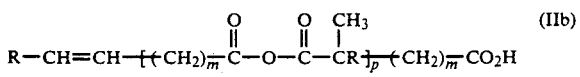

wherein R, m and p have the previously stated meanings. The preferred polymer products have molecular weights between about 1000 and about 10,000, especially between 1000 and 5000, and have a preponderance of linear product. The molar ratio of linear to branched linkages in the polymer product is as high as about 7 or even higher.

The polyketone and polyanhydride products are thermoplastic polymers and have utility in viscosifiers, sealants and adhesives as is conventional for many thermoplastic polymers.

The invention is further illustrated by the following Illustrative Embodiments which should not be regarded as limiting the invention.

Illustrative Embodiment I

To a Hastelloy C autoclave of 300 ml capacity equipped with a magnetic stirrer were charged 50 ml of diethylene glycol dimethyl ether, 20 ml of 10-undecen-1-ol, 0.4 mmol palladium acetate, 8 mmol triphenylphosphine, and 4 mmol of p-toluenesulfonic acid. The autoclave was flushed with carbon monoxide and carbon monoxide was then added until a pressure of 40 bar was reached. The autoclave and contents were heated to 125° C. and maintained at that temperature for 5 hours. The autoclave was then cooled to ambient temperature and the pressure was released. The resulting mixture was analyzed by gas-liquid chromatography which indicated that the conversion of 10-undecen-1-ol was 98%. The number average molecular weight of the polymeric product, as determined by standard nuclear magnetic resonance (NMR) techniques, was 1700 and the ratio of linear to α-branched linkages was about 7.3:1.

Illustrative Embodiment II

The procedure of Illustrative Embodiment I was repeated except that 50 ml of toluene was employed as diluent instead of 50 ml of the diethylene glycol dimethyl ether. The conversion of 10-undecen-1-ol was 98%. The number average molecular weight of the polyester product was 1800 and the ratio of linear to α-branched linkages was about 7:1.

Illustrative Embodiment III

The procedure of Illustrative Embodiment II was repeated. The conversion of 10-undecen-1-ol was 99% and the number average molecular weight of the polyester product was about 4000.

Illustrative Embodiment IV

The procedure of Illustrative Embodiment I was repeated except that 10 g of 10-undecenoic acid were provided instead of 20 g of 10-undecen-1 and tri(p-chlorophenyl)phosphine was added instead of triphenylphosphine. t the conclusion of reaction the conversion of undecenoic acid was 95% and the molecular weight of the polyanhydride product was about 1000.

What is claimed is:

1. A process for producing a polymer by reacting an ethylenically unsaturated alcohol of up to 30 carbon atoms inclusive, wherein the alcohol has at least 4 carbon atoms between the hydroxyl and the ethylenic moiety, with carbon monoxide in an inert aprotic reaction diluent at a temperature below 140° C. and in the presence of a catalyst composition formed from a palladium salt, a tertiary aromatic monophosphine, and an oxygen-containing acid having a pKa below 2, with or without a bidentate phosphorus ligand, wherein the molar ratio of total phosphine to palladium is less than 10 and the molar ratio of acid to total phosphine is less than 1.

2. The process of claim 1 wherein the unsaturated reactant is a primary alcohol of the formula

wherein R is hydrogen or straight chain alkyl and n is an integer of at least 4.

3. The process of claim 2 wherein the tertiary phosphine is of the formula

wherein R' independently is aromatic of up to 14 carbon atoms, and the bidentate phosphorus ligand, present in a molar quantity less than 10 times the molar quantity of the monophosphine, is of the formula

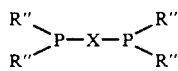

wherein R" independently is hydrocarbyl aromatic of up to 12 carbon atoms inclusive, and X is a divalent hydrocarbyl aliphatic linking group of up to 10 carbon atoms with from 2 to 5 carbon atoms inclusive in the bridge.

4. The process of claim 3 wherein the palladium salt is palladium acetate.

5. The process of claim 4 wherein the tertiary monophosphine is triphenylphosphine or tri(p-chlorophenyl)phosphine.

6. The process of claim 5 wherein the bidentate phosphorus ligand is present, and is 1,3-bis(diphenylphosphino)propane or 1,4-bis(diphenylphosphino)butane.

7. The process of claim 6 wherein the unsaturated alcohol is 10-undecen-1-ol.

8. The process of claim 4 wherein the tertiary monophosphine is triphenylphosphine and the bidentate phosphorus ligand is present and is 1,3-bis(diphenylphosphino)propane.

9. The process of claim 8 wherein the unsaturated alcohol is 10-undecen-1-ol.

* * * * *